United States Patent
Romano, Jr. et al.

(10) Patent No.: US 6,224,202 B1
(45) Date of Patent: *May 1, 2001

(54) INK JET PRINTING METHOD

(75) Inventors: Charles E. Romano, Jr., Rochester; Elizabeth A. Gallo, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,203

(22) Filed: Dec. 18, 1998

(51) Int. Cl.$^7$ .................................................... G01D 11/00
(52) U.S. Cl. ............................ 347/100; 247/105; 247/95
(58) Field of Search .................................... 347/100, 105, 347/47, 95

(56) References Cited

U.S. PATENT DOCUMENTS

| | | | |
|---|---|---|---|
| 5,254,159 | * | 10/1993 | Gundlach et al. ...................... 106/22 |
| 6,137,514 | * | 10/2000 | Kovacs et al. ........................ 347/100 |

FOREIGN PATENT DOCUMENTS

| | | | |
|---|---|---|---|
| 0 705 704 A2 | 4/1996 | (EP) . | |
| 0 959 113 A1 | 11/1999 | (EP) . | |
| 2 324 799 | 11/1998 | (GB) . | |
| 2 324 800 | 11/1998 | (GB) . | |
| 62-008819 | 11/1988 | (JP) . | |
| 10-219157A | 8/1998 | (JP) | ............................. C09D/11/00 |

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing process for improving the water-fastness of an ink jet image comprising the steps of:

A) providing an ink jet printer that is responsive to digital data signals;

B) loading the printer with an image-recording element comprising a support having thereon an ink-receptive layer comprising a cross-linkable polymer;

C) loading the printer with an ink jet ink composition comprising water, an anionic, water-soluble dye and from about 0.1 to about 5% by weight of a hardener; and D) printing on the image-recording element using the ink jet ink composition in response to the digital data signals.

9 Claims, No Drawings

INK JET PRINTING METHOD

CROSS REFERENCE TO RELATED APPLICATION

Reference is made to commonly-assigned copending U.S. patent application Ser. No. 09/216,531, filed Dec. 18, 1998, entitled "Ink Jet Printing Process", of Gallo et al; and Copending U.S. patent application Ser. No. 09/215,711, filed Dec. 18, 1998, entitled "Ink Jet Printing Process", of Romano, Jr., et al, now U.S. Pat. No. 6,170,944; and Copending U.S. patent application Ser. No. 09/216,558 filed Dec. 18, 1998, entitled "Ink Jet Printing Process", of Romano, Jr., et al, now U.S. Pat. No. 6,142,621; and Copending U.S. patent application Ser. No. 09/216,149 filed Dec. 18, 1998, entitled "Ink Jet Composition", of Romano, Jr., et al, now U.S. Pat. No. 6,156,110; and Copending U.S. patent application Ser. No. 09/216,653, filed Dec. 18, 1998, entitled "Ink Jet Printing Process", of Kovacs et al; and Copending U.S. patent application Ser. No. 09/216,288 filed Dec. 18, 1998, entitled "Ink Jet Printing Process", of Kovacs et al; and Copending U.S. patent application Ser. No. 09/216,350, filed filed Dec. 18, 1998, entitled "Ink Jet Printing Process", of Kovacs et al; and Copending U.S. patent application Ser. No. 09/216,147 filed Dec. 18, 1998, entitled "Ink Jet Ink Composition", of Kovacs et al; now U.S. Pat. No. 6,139,611; and Copending U.S. patent application Ser. No. 09/216,304 filed Dec. 18, 1998, entitled "Ink Jet Printing Method", of Kovacs et al, now U.S. Pat. No. 6,137,514.

Copending U.S. patent application Ser. No. 09/083,875, filed May 22, 1998, entitled "Inkjet Images on PVA Overcoated with Hardener Solution", of Erdtmann et al.; and Copending U.S. patent application Ser. No. 09/083,605 filed May 22, 1998, entitled "Ink Jet Prints Overcoated with Hardener", of Erdtmann et al., the teachings of which are incorporated herein by reference.

FIELD OF THE INVENTION

This invention relates to an ink jet printing method using a certain ink jet ink composition which provides an image having improved water-fastness.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature. Commonly used carrier media include water, mixtures of water and organic co-solvents and organic solvents, such as hydrocarbons, esters, ketones, etc.

DESCRIPTION OF RELATED ART

JP 10-219157 relates to an ink jet ink comprising an aqueous medium, a colorant and a very small amount of glutaraldehyde as a biocide.

There is a problem with using this ink, however, in that when it is printed on an image-recording element, the resultant image has poor water-fastness.

It is an object of this invention to provide a method for using an ink jet ink composition which when printed on an image-recording element will provide an image having an improved water-fastness. It is another object of this invention to provide a method for using an ink jet composition which employs an anionic, water-soluble dye.

SUMMARY OF THE INVENTION

These and other objects are achieved in accordance with this invention which relates to an ink jet printing process for improving the water-fastness of an ink jet image comprising the steps of:

A) providing an ink jet printer that is responsive to digital data signals;

B) loading the printer with an image-recording element comprising a support having thereon an ink-receptive layer comprising a cross-linkable polymer;

C) loading the printer with an ink jet ink composition comprising water, an anionic, water-soluble dye and from about 0.1 to about 10% by weight of a hardener; and D) printing on the image-recording element using the ink jet ink composition in response to the digital data signals.

Use of the invention enables an ink jet image to be obtained on an image-recording element which will have improved water-fastness.

DETAILED DESCRIPTION OF THE INVENTION

Any hardener can be used in the composition employed in the method of the invention provided it will cross-link a cross-linkable polymer employed in the recording element onto which the ink composition is printed. Hardeners may be used in the ink composition of the invention in an amount of from about 0.1 to about 10% by weight, preferably from about 0.25 to about 2% by weight.

Examples of hardeners that can be employed in the composition used in the method of the invention of the invention fall into several different classes such as the following (including mixtures thereof):

a) formaldehyde and compounds that contain two or more aldehyde functional groups such as the homologous series of dialdehydes ranging from glyoxal to adipaldehyde including succinaldehyde and glutaraldehyde; diglycolaldehyde; aromatic dialdehydes, etc.;

b) blocked hardeners (substances usually derived from the active hardener that release the active compound under appropriate conditions) such as substances that contain blocked aldehyde functional groups, such as tetrahydro-4-hydroxy-5-methyl-2(1H)-pyrimidinone polymers, polymers of the type having a glyoxal polyol reaction product consisting of 1 anhydroglucose unit: 2 glyoxal units, dimethoxylethanal-melamine non-formaldehyde resins, 2,3-dihydroxy-1,4-dioxane, blocked dialdehydes and N-methylol compounds obtained from the condensation of formaldehyde with various aliphatic or cyclic amides, ureas, and nitrogen heterocycles;

c) active olefinic compounds having two or more olefinic bonds, especially unsubstituted vinyl groups, activated by adjacent electron withdrawing groups, such as divinyl ketone; resorcinol bis(vinylsulfonate); 4,6-bis(vinylsulfonyl)-m-xylene; bis(vinylsulfonylalkyl) ethers and amines; 1,3,5-tris(vinylsulfonyl)hexahydro-s-triazine; diacrylamide; 1,3-bis(acryloyl)urea; N,N'-bismaleimides; bisisomaleimides; bis(2-acetoxyethyl) ketone; 1,3,5-triacryloylhexahydro-s-triazine; and blocked active olefins of the type bis(2-acetoxyethyl) ketone and 3,8-dioxodecane-1,10-bis(pyridinium perchlorate)bis(vinyl sulfonylmethane), bis(vinyl sulfonylmethyl ether), and the like;

d) compounds that contain two or more amino groups such as ethylene diamine; and e) inorganic salts such as aluminum sulfate; potassium and ammonium alums of aluminum; ammonium zirconium carbonate; chromium salts such as chromium sulfate and chromium alum; and salts of titanium dioxide, zirconium dioxide, etc.

Specific examples of hardeners useful in the composition employed in the method of the invention of the invention include the following:

Hardener 1: aluminum sulfate

Hardener 2: bis(vinyl sulfonylmethane) (Eastman Kodak Company)

Hardener 3: 2,3-dihydroxy-1,4-dioxane (Aldrich Chemical Co.)

Hardener 4: ethylene diamine

Hardener 5: glyoxal

Hardener 6: bis(vinyl sulfonylmethyl ether) (Eastman Kodak Company)

Hardener 7: glutaraldehyde

Hardener 8: a glyoxal polyol reaction product consisting of 1 anhydroglucose unit: 2 glyoxal units, SEQUAREZ® 755 (Sequa Chemicals, Inc.)

Hardener 9: a cyclic urea glyoxal condensate consisting of 1 cyclic urea unit: 1 glyoxal unit, SUNREZ® 700M (Sequa Chemicals, Inc.)

Hardener 10: dimethoxylethanal-melamine non-formaldehyde resin, Sequa CPD3086-100 (Sequa Chemicals, Inc).

In a preferred embodiment, the hardener used in the composition employed in the method of the invention of the invention is aluminum sulfate, bis(vinyl sulfonylmethane), 2,3-dihydroxy-1,4-dioxane, or ethylene diamine.

Any anionic, water-soluble dye may be used in composition employed in the method of the invention such as a dye having an anionic group, e.g., a sulfo group or a carboxylic group. The anionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the anionic, water-soluble dye which may be used in the composition employed in the method of the invention is a metallized azo dye, a non-metallized azo dye, a xanthene dye, a metallophthalocyanine dye or a sulfur dye. Mixtures of these dyes may also be used. The dye may be present in an amount of from about 0.1 to about 10% by weight, preferably from about 0.25 to about 3% by weight.

The support for the image-recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin® (Tyvek®, synthetic paper (DuPont Corp.), and OPPalyte® films (Mobil Chemical Co.) and other composite films listed in U.S. Pat. No. 5,244,861.

A mordant can be used in the ink-receptive layer of the image-recording element used in the invention to fix the anionic dye. For example, there may be used a cationic polymer, e.g., a polymeric quartenary ammonium compound, or a basic polymer, such as poly (dimethylaminoethyl)methacrylate, polyalkylenepolyamines, and products of the condensation thereof with dicyanodiamide, amine-epichlorohydrin polycondensates; divalent Group II metal ions; lecithin and phospholipid compounds. In a preferred embodiment, the following mordants may be employed in recording elements used in the invention:

Mordant 1 vinylbenzyl trimethyl ammonium chloride/ethylene glycol dimethacrylate (Eastman Kodak Company)

Mordant 2 poly(vinylbenzyl trimethylammonium chloride) SP2 707 (SP2 Company)

Mordant 3 poly(2-N,N,N-trimethylammonium)ethyl methacrylate methosulfate (Eastman Kodak Company)

Mordant 4 poly(3-N,N,N-trimethylammonium)propyl methacrylate chloride, Polycare® 133 (Rhone-Poulenc Co.)

Mordant 5 poly(diallyldimethyl ammonium chloride) (Aldrich Chemical Co.)

Mordant 6 cationic polyethylene polyamine resin, Niccajet® 117 (Nicca-USA)

Mordant 7 amine and glycidyl polymer, Niccajet® 450, (Nicca-USA)

Mordant 8 hydroxyethylcellulose derivitized with (3-N,N,N-trimethylammonium)propyl chloride, Celquat® (SC-240C (National Starch Co.)

Mordant 9 alumina coated colloidal silica, Ludox® (CL (DuPont)

Mordant 10 copolymer of vinylbenzyltrimethylammonium chloride, butyl acrylate, and bis-vinylbenzene in a 50:30:20 ratio (Eastman Kodak Company).

In a preferred embodiment of the invention, the mordant employed is vinylbenzyl trimethyl ammonium chloride/ethylene glycol dimethacrylate; poly(vinylbenzyl trimethylammonium chloride); or poly(2-N,N,N-trimethylammonium)ethyl methacrylate methosulfate.

The above mordants may be employed in any amount effective for the intended purpose. In general, good results are obtained when the mordant is present in an amount of from about 0.5 to about 5 g/m² of element.

As noted above, an ink-receptive layer is employed in the recording element used in the invention and comprises a cross-linkable polymer. In a preferred embodiment, the polymer is an acetoacetylated poly(vinyl alcohol) as described, for example, in U.S. Pat. No. 4,350,788, the disclosure of which is hereby incorporated by reference. These materials are available commercially as Gohsefimer® from Nippon Gohsei.

The ink-receptive layer used in recording elements employed in the invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like.

A humectant may also be employed in the ink jet composition employed in the method of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the method of the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 30%.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to the composition employed in the invention to adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

The pH of the aqueous ink composition employed in the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following substituents by weight: anionic dye (0.05–10%), water (20–95%), hardener (0.1 to 10%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks used in this invention may be employed in ink jet printing wherein liquid ink drops are applied in a controlled fashion to an ink receptive layer substrate, by ejecting ink droplets from a plurality of nozzles or orifices of the print head of an ink jet printer.

The following examples illustrate the utility of the present invention.

EXAMPLES

Example 1

A photographic grade, polyethylene resin-coated paper was given a corona discharge treatment and then coated with an imaging layer of 7.7 g/m$^2$ of acetoacetylated poly(vinyl alcohol), Gohsefimer® Z-200, (Nippon Gohsei) and 0.9 g/m$^2$ of Mordant 1 or Mordant 2. The coatings were applied using a extrusion hopper and air dried.

A Hewlett-Packard cartridge (HP 51649A) was obtained and emptied. It was refilled with a control ink consisting of 20% by weight Pro-Jet Fast Cyan 2 (Zeneca Specialties Co.) dye concentrate to give approximately 1% of cyan dye, 16% by weight diethylene glycol as a humectant, 0.5% by weight Surfynol® 465 surfactant (Air Products Co.), and water to total 100%. Inks according to the invention were prepared as described for the control ink but included 1% by weight of the hardener as indicated in Table 1.

A cyan patch was then printed on the receivers at 50% laydown using a Hewlett-Packard Printer (HP692C) and the above cartridge.

The elements were then immersed in distilled water for 1 hour and then allowed to air dry overnight. The optical density was measured before and after immersion in water with an X-Rite® densitometer. Water-fastness is measured as the per cent retained optical density after immersion in water. Values closest to 100% are preferred. The following results were obtained:

TABLE 1

| Element | Mordant | Hardener In Ink | % Retained Cyan Optical Density After Water Test |
|---|---|---|---|
| 1 | 1 | None (Control) | 4 |
| 2 | 1 | 1 | 98 |
| 3 | 1 | 2 | 92 |
| 4 | 1 | 3 | 93 |
| 5 | 1 | 4 | 92 |
| 6 | 2 | None (Control) | 85 |
| 7 | 2 | 1 | 92 |

TABLE 1-continued

| Element | Mordant | Hardener In Ink | % Retained Cyan Optical Density After Water Test |
|---|---|---|---|
| 8 | 2 | 2 | 96 |
| 9 | 2 | 3 | 96 |
| 10 | 2 | 4 | 97 |

The above data show that an ink jet image obtained using an ink jet ink in accordance with the invention has superior water-fastness as compared to compositions which did not contain any hardener.

Example 2

Example 1 was repeated except that Gohsefimer® (Z-320, (Nippon Gohsei) acetoacetylated poly(vinyl alcohol) was employed instead of Gohsefimer® Z-200 and the mordant was Mordant 3. The elements were tested as in Example 1 with the following results:

TABLE 2

| Element | Hardener In Ink | % Retained Cyan Optical Density After Water Test |
|---|---|---|
| 11 | None (Control) | 6 |
| 12 | 1 | 84 |
| 13 | 2 | 69 |
| 14 | 3 | 94 |
| 15 | 4 | 78 |

The above data show that an ink jet image obtained using an ink jet ink in accordance with the invention has superior water-fastness as compared to control ink compositions which did not contain any hardener.

The invention has been described in detail with particular reference to certain preferred embodiments thereof, but it will be understood that variations and modifications can be effected within the spirit and scope of the invention.

What is claimed is:

1. An ink jet printing process for improving the water-fastness of an ink jet image comprising the steps of:
   A) providing an ink jet printer that is responsive to digital data signals;
   B) loading said printer with an image-recording element comprising a support having thereon an ink-receptive layer comprising a cross-linkable polymer;
   C) loading said printer with an ink jet ink composition comprising water, an anionic, water-soluble dye and from about 0.1 to about 10% by weight of a hardener; and
   D) printing on said image-recording element using said ink jet ink composition in response to said digital data signals.

2. The method of claim 1 wherein said hardener is present from about 0.25 to about 2% by weight of said composition.

3. The method of claim 1 wherein said dye is present in an amount of from about 0.1 to about 10% by weight of said composition.

4. The method of claim 1 wherein a humectant is present in an amount of up to about 70% by weight of said composition.

5. The method of claim 4 wherein said humectant is diethylene glycol, glycerol or diethylene glycol monobutylether.

6. The method of claim 1 wherein said hardener is aluminum sulfate, bis(vinyl sulfonylmethane), 2,3-dihydroxy-1,4-dioxane, or ethylene diamine.

7. The method of claim 1 wherein said cross-linkable polymer is acetoacetylated poly(vinyl alcohol).

8. The method of claim 1 wherein said ink-receptive layer also contains a mordant.

9. The method of claim 8 wherein said mordant is vinylbenzyl trimethyl ammonium chloride/ethylene glycol dimethacrylate; poly(vinylbenzyl trimethylammonium chloride); or poly(2-N,N,N-trimethylammonium)ethyl methacrylate methosulfate.

* * * * *